June 2, 1942.  T. J. ESTAQUE  2,285,196
BRAKE
Filed June 29, 1940

Inventor
T. J. ESTAQUE.
William E. Hall.
Attorney

Patented June 2, 1942

2,285,196

UNITED STATES PATENT OFFICE 2,285,196

BRAKE

Theodore J. Estaque, Los Angeles, Calif.

Application June 29, 1940, Serial No. 343,193

8 Claims. (Cl. 188—79.5)

My invention relates to a brake, particularly adapted for vehicles.

One of the principal objects of this invention is to provide a brake of this class having brake shoes in which the adjacent ends of a pair of brake shoes are moved relative to each other, and in which the opposite ends are so connected that movement of one brake shoe is readily transmitted to the other.

Another important object of this invention is to provide such a brake in which the connected ends may be readily adjusted relative to each other for varying the braking diameter of the shoes.

A very important feature of this invention is to provide a relatively large ball interposed between the aforementioned connected ends of the shoes and in which the ball engages adjacent ends of plungers and the wall of the opening into which said ends of the plungers extend, thereby insuring at all times means for properly connecting the end of the plungers even though the shoes are temporarily or of necessity separated.

Another object of this invention is to provide a ball take-up and brake transmitting means for adjusting the adjacent ends of brake shoes, which may easily replace the adjusting wedge and screw now commonly used in many vehicles.

Another object of this invention is to provide a separate unit, for adjusting and transmitting braking power from one shoe to the next, which unit may be easily substituted for similar units now installed in present vehicles.

With these and other objects in view, as will appear hereinafter, I have devised a vehicle brake, having certain novel features of construction, combination, and arrangement of parts and portions, as will be hereinafter described in detail and particularly set forth in the appended claims, reference being had to the accompanying drawing and to the characters of reference thereon, which form a part of this application, in which:

Figure 1:
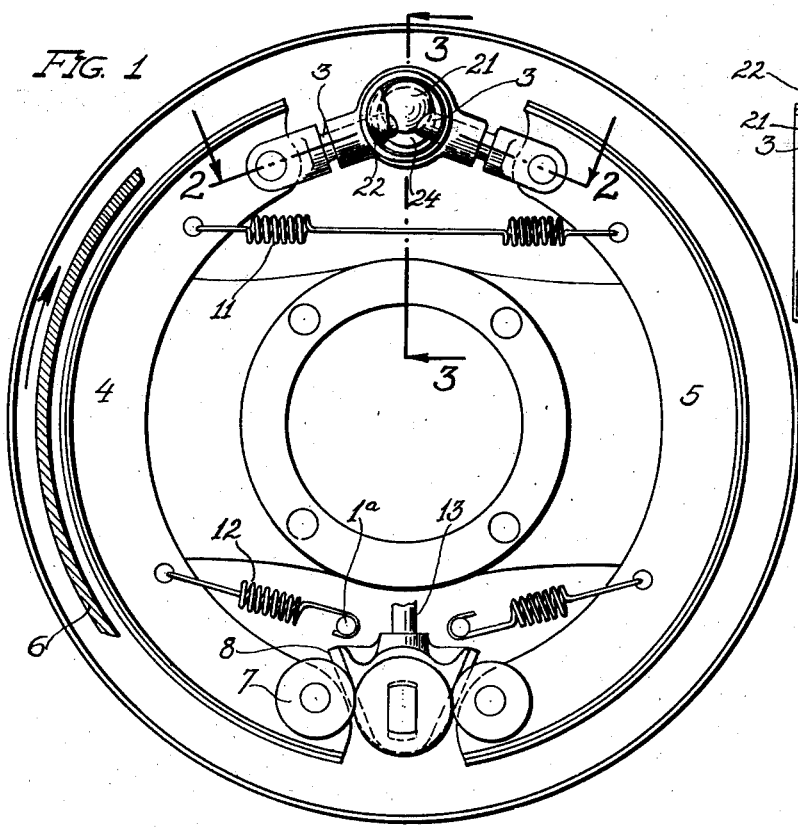
Fig. 1 is an inside view of a vehicle brake, showing my invention, in one form, incorporated therewith.
Figure 3:
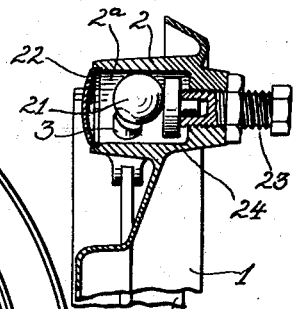
Fig. 3 is a sectional view thereof, taken at 3—3 of Fig. 1.
Figure 2:
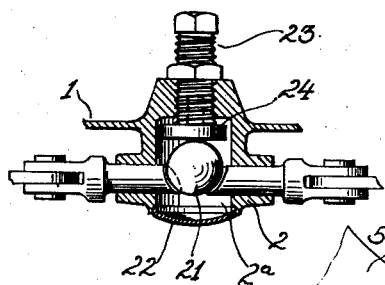
Fig. 2 is a fragmentary section thereof, taken at 2—2 of Fig. 1.

The brake, shown in Fig. 1, is supported on a backing plate 1, on which is supported, at the upper portion, as in certain modern vehicles, a bracket 2 having a large cylindrical opening or bore 2ª. From this extends a pair of plungers 3, the plungers radiating substantially from the bracket, as shown. To the outer ends of the plungers are pivotally secured brake shoes 4 and 5, having suitable brake lining at the exterior surfaces. The brake surfaces or lining of these shoes are adapted to engage the inner surface of a brake drum 6, shown fragmentarily in Fig. 1. The free ends of the brake shoes are provided with axially spaced rollers 7. Between the rollers of the two shoes is reciprocally mounted a wedge 8 for moving the brake shoes relative to each other, or, as shown in this instance, for spreading the free ends of the shoes and forcing the same against the brake drum.

The connected ends of the shoes, that is, the ends provided with the plungers, are resiliently held together by a spring 11. The free ends of the shoes are also resiliently held together, but, in this instance, by separate springs 12, which resiliently draw the free ends of the shoes toward pins 1ª fixed on the backing plate. These springs force the rollers 7 against the opposite sides of the brake actuating wedge 8. This wedge is shown operated by a rod or other suitable means 13.

Within the bore or opening 2ª of the bracket is placed a relatively large ball 21 which engages wedge-like surfaces at the adjacent ends of the plungers and also the wall of the opening. This ball is inserted through the end of the wheel bore 2ª opposite the backing plate, that is, from the wheel side of the bore. This end of the bore is enclosed by a suitable stamping 22.

The ball is held in the aforementioned position by a thrust member which is preferably an adjusting screw 23 which extends into the axial portion of the opening or bore 2ª from the inner or backing plate side of the brake. At the inner end of the adjusting screw is provided a hardened wearing disc 24 having a stem extending into the inner end of the adjusting screw. The ball, during the application of the brake, engages the surfaces at the ends of the plungers and is permitted to revolve with respect to the plungers. This ball also engages and is permitted to revolve relative to the inner wall of the opening 2ª and the wearing surface of the disc 24, the inner wall of the opening and the disc holding the ball in the position between the inner ends of the plungers, as mentioned above.

The ball 21 has been referred to as relatively large, the diameter being relatively large with respect to the diameters of the opening 2ª and the plungers 3. The diameter of the ball is such that the center thereof falls within or substantially within the contours of the plungers, when theoretically extended inwardly, as shown. Describing such size of the ball with respect to the radii of the cylindrical opening 2ª and the plungers 3, the radius of the ball may be defined as being at least equal to or greater than the difference between the radii of the cylindrical opening and that of a plunger.

When the wheel revolves in the direction of the arrow, indicated in Fig. 1, and the brake is applied, the brake shoe 4 is applied with greater force against the brake drum 6 than the brake shoe 5, and as the brake shoe 4 is carried with the brake drum, the braking force is transmitted through the plungers and ball 21 to the brake shoe 5. In the event that the brake shoes are released beyond the normal limits, the ball, being made of relatively large size, is not permitted to drop from proper engagement with the ends of the plunger and thus render ineffective the transmission of the braking force from one plunger to the other. The engagement of the ball with the inner wall of the opening reduces such inoperativeness to a minimum.

Figure 4:
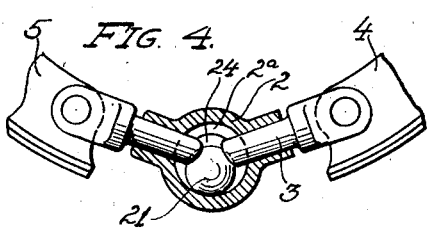
Fig. 4 is a fragmentary view, similar to that of Fig. 1, of a slightly modified form of construction; and, Fig. 5 is a fragmentary view of another slightly modified form of construction of my invention.

In the modified construction, shown in Fig. 4, the ball is positioned at the bottom of the brake mechanism and engages the bottom side of the opening 2ª, thus rendering absolutely impossible the displacement of the ball, even though the plungers are separated beyond the normal positions.

The axis of the ball is positioned intermediate the axes of the plungers and the inner end of the adjusting screw so that as the latter is screwed inwardly, the ball is forced against the wedge faces at the inner ends of the plungers and forces the same apart, thus taking up wear of the brake shoes.

Figure 5:
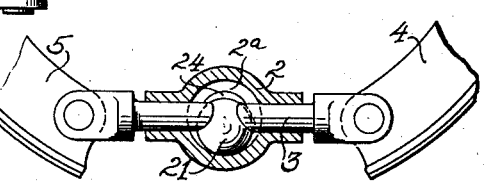

In the modified structure, shown in Fig. 5, the ball is also located at the bottom of the brake. In this instance, the plungers 3 are aligned and also radiate outwardly from the opening or bore 2ª of the bracket 2.

In both of the modified structures, the ball rests at all times at the bottom of the opening 2ª; but in the modified structure shown in Fig. 5, the braking force from one brake shoe is transmitted from one plunger in a more direct line to the other plunger.

Though I have shown and described a particular construction, combination, and arrangement of parts and portions of my brake, and certain modifications thereof, I do not wish to be limited to the same, but desire to include in the scope of my invention the construction, combination, and arrangement substantially as set forth in the appended claims.

I claim:

1. A brake having shoes provided with a shiftable connection including a pair of endwise-movable plungers arranged substantially end to end and engaging the shoes respectively, stationary means embracing and guiding said plungers and provided with an elongated opening, parallel to the axis of the brake, into which the adjacent ends of the plungers extend, the adjacent faces of the plungers having converging wedge faces, a ball normally engaging said faces and the wall of the opening, and a thrust member mounted in the stationary member and adjustable in a direction paralleling the brake axis and with which the ball has rolling contact and which is operable to force the ball between said faces to wedge the plungers apart to adjust the shoes for wear.

2. A brake having shoes provided with a shiftable connection including a pair of endwise-movable plungers arranged substantially end to end and engaging the shoes respectively, stationary means embracing and guiding said plungers and provided with an elongated opening, parallel to the axis of the brake, into which the adjacent ends of the plungers extend, the adjacent faces of the plungers having converging wedge faces, a ball normally engaging said faces and the wall of the opening, and means for circumferentially shifting the shoes, circumferential movement of one shoe being transmitted to the adjacent shoe through said plungers and ball.

3. In a brake of the class described, a backing plate, a bracket thereon having a cylindrical opening with its axis parallel to the axis of the backing plate, plungers extending outwardly from the bracket, a ball normally engaging the inner ends of the plungers and the wall of the opening of the bracket, brake shoes pivoted with one end to the outer ends of the plungers, and means at the opposite ends of the shoes for moving the same relative to each other, movement of one shoe being transmitted to the adjacent shoe through the plungers and the ball.

4. In a brake of the class described, a backing plate, a bracket thereon having a cylindrical opening with its axis parallel to the axis of the backing plate, plungers extending outwardly from the bracket, the adjacent faces of the plungers having converging wedge faces, a ball normally engaging said faces of the plungers and the wall of the opening of the bracket, brake shoes pivoted with one end to the outer ends of the plungers, means at the opposite ends of the shoes for moving the same relative to each other, movement of one shoe being transmitted to the adjacent shoe through the plungers and the ball, and a thrust member mounted in the bracket and adjustable in a direction paralleling the axis of the backing plate and which is operable to force the ball between said faces to wedge the plungers apart and against the wall of the cylindrical opening to adjust the shoes for wear.

5. In a brake of the class described, a backing plate, a bracket thereon, having a cylindrical opening with its axis parallel to the axis of the backing plate, plungers extending outwardly from the bracket, a ball normally engaging the inner ends of the plungers and the wall of the opening of the bracket, the diameter of the ball being substantially larger than the radius of the opening, brake shoes pivoted with one end to the outer ends of the plungers, and means at the opposite ends of the shoes for moving the same relative to each other, movement of one shoe being transmitted to the adjacent shoe through the plungers and the ball.

6. In a brake of the class described, a backing plate, a bracket thereon, having a cylindrical opening with its axis parallel to the axis of the backing plate, plungers extending outwardly from the bracket, a ball normally engaging the inner ends of the plungers and the wall of the opening of the bracket, the diameter of the ball being substantially larger than the radius of the opening, brake shoes pivoted with one end of the outer ends of the plungers, and a thrust member mounted in the bracket and adjustable inwardly and which is operable for forcing the ball between the inner ends of the plungers to wedge the latter apart for adjusting the shoes for wear.

7. In a brake of the class described, a backing plate having a cylindrical opening with its axis parallel to the axis of the backing plate, plungers extending outwardly from the cylindrical opening in the backing plate, a ball normally engaging the inner ends of the plungers and the wall of the opening, the center of the ball falling substantially within the contour of the plungers when longitudinally extended, brake shoes pivoted with one end to the outer ends of the plungers, and means at the opposite ends of the shoes for moving the same relative to each other, movement of one shoe being transmitted to the adjacent shoe through the plungers and the ball.

8. In a brake of the class described, a backing plate having a cylindrical opening with its axis parallel to the axis of the backing plate, plungers extending outwardly from the cylindrical opening in the backing plate, a ball normally engaging the inner ends of the plungers and the wall of the opening, the radius of the ball being at least greater than the difference between the radius of the cylindrical opening and that of a plunger, brake shoes pivoted with one end to the outer ends of the plungers, and means at the opposite ends of the shoes for moving the same relative to each other, movement of one shoe being transmitted to the adjacent shoe through the plungers and the ball.

THEODORE J. ESTAQUE.